No. 827,277. PATENTED JULY 31, 1906.
W. W. WEITLING.
ART OF MAKING HOLLOW HARD RUBBER ARTICLES.
APPLICATION FILED MAR. 19, 1906.

Attest:
E. M. Mitchell
A. L. O'Brien

Inventor:
WILLIAM W. WEITLING
by Dickerson, Brown, Raegener & Binney
Attys.

UNITED STATES PATENT OFFICE.

WILLIAM W. WEITLING, OF COLLEGE POINT, NEW YORK, ASSIGNOR TO AMERICAN HARD RUBBER COMPANY, A CORPORATION OF NEW YORK.

ART OF MAKING HOLLOW HARD-RUBBER ARTICLES.

No. 827,277.  
Specification of Letters Patent.  
Patented July 31, 1906.

Application filed March 19, 1906. Serial No. 306,771.

*To all whom it may concern:*

Be it known that I, WILLIAM W. WEITLING, a citizen of the United States, and a resident of College Point, county of Queens, and State of New York, have invented certain new and useful Improvements in the Art of Making Hollow Hard-Rubber Articles, of which the following is a specification.

My invention relates to the art or method of making hard-rubber articles having interior cavities. Its object is to provide a method by which the heating fluid, as steam, used in vulcanizing the articles may be admitted to the interior of the cavity so as to equalize the pressure and prevent collapse of the article before the completion of the process of vulcanization, at the same time making the aperture so small that it will be inconspicuous in the completed article.

The invention relates particularly to the method of manufacture of such hollow articles as are vulcanized between sheets of tinfoil.

Figure 1:
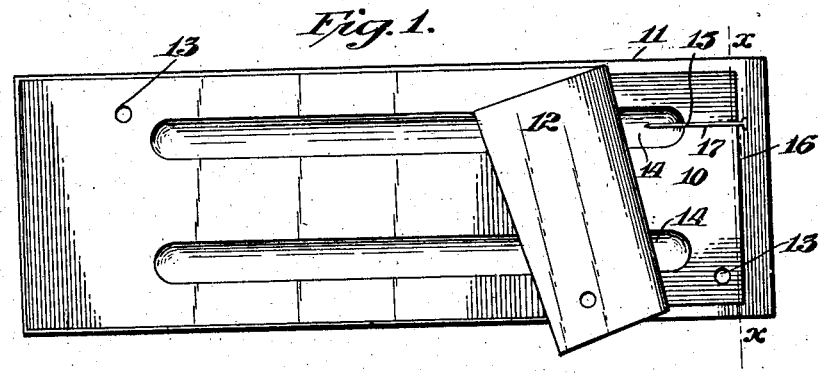
Figure 2:
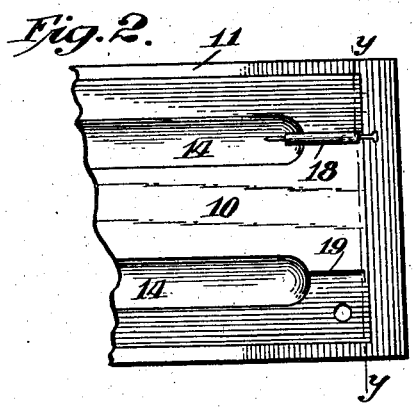
Figure 3:
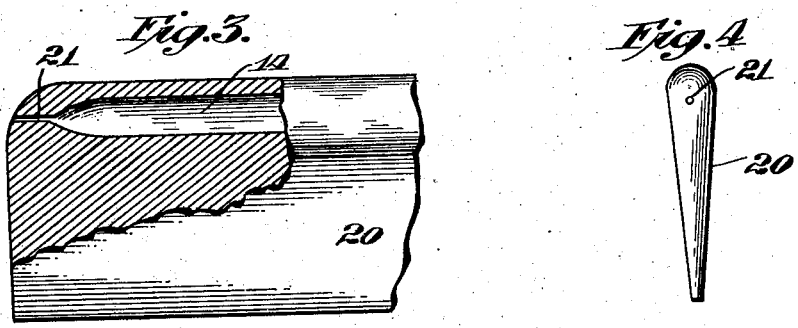
Figure 4:
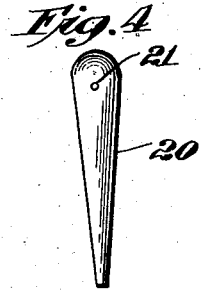

In the drawings, Figure 1 represents a blank for making one half of the completed article during an early stage of its manufacture. Fig. 2 is a partial view of a similar blank, showing a modification of the application of my invention. Fig. 3 is a partial view of a comb-blank cut away to more fully illustrate the invention. Fig. 4 is an end view of the comb-blank shown in Fig. 3.

Referring to Fig. 1 of the drawings, it may be stated that in making the hollow article chosen as the subject of illustration by this process sheets of soft unvulcanized rubber (designated as 10) are placed between a layer of relatively thick tin-foil 11 and a layer of lighter tin-foil 12. The packs so made up are then pressed between dies to form one-half of the article having the desired cavity therein, as shown in Fig. 1 of the drawings. After the preliminary pressing operation, which is performed in a suitable die, the sheet of tin-foil 12, which covers the concave or hollow side of the article, is stripped off and two of the blanks are placed face to face with their concave sides together, the gum portions 10 being united and registered by means of the apertures 13, pierced through the blanks or in any other desired manner. The two halves 10 so placed together and each covered on its outer side by the tin-foil sheet 11 are then again pressed in a die to firmly unite the sheets of gum 10, except where they are concaved or hollowed at 14, and the articles are then placed in a vulcanizing-chamber to which steam is admitted for vulcanizing them into hard rubber in the usual well-known manner. Under the present invention, however, before placing the two halves together the ends of the sheets 11 are cut off—*e. g.*, as indicated by the line *x x*—and a pin or wire 17 is placed on one sheet extending from the cavity 14 to the end of the sheet, as shown in the drawings. The two halves are then pressed together, as above stated, after which the pin is withdrawn, thus leaving a very small aperture 17, connecting the cavity 14 with the atmosphere. The united halves, with their foil covering, are then placed or hung in the vulcanizing-chamber. It is obvious that the aperture 17 permits the ingress of steam or heated vulcanizing fluid to the interior of the cavity, so that the pressure is equalized and any danger of collapsing the halves together is prevented.

Fig. 2 of the drawings represents a slight modification of the method of securing the desired aperture between the cavity 14 and the periphery of the articles after they are pressed together, in which the pin 17 is first incased by wrapping around it a thin sheet of unvulcanized rubber 18. After cutting off the ends of the sheets along the line *y y* the incased pin or wire is placed in a recess 19, the two halves united by pressing in a suitable die, and the pin withdrawn, the object being, as above stated, to leave a suitable aperture for the ingress of steam to the cavity 14. This second method is sometimes advantageous in that the casing 18, while of soft unvulcanized rubber, may be somewhat drier than the tacky material of which the sheets 10 are composed, so that the withdrawal of the pin is facilitated and the vent hole or aperture is more certain to remain open during the necessary handling and during the process of vulcanization.

Both Figs. 1 and 2 of the drawings show a half-blank in which there are two cavities 14. It is obvious that both are provided before vulcanizing with means providing the apertures above described.

Fig. 3 of the drawings represents a vulcanized article 20, which in the present instance is a comb-blank, ready to have the teeth cut therein. It will be seen that from the cavity 14 to the end of the back of the comb proceeds a small aperture 21, which is, however, so small, as shown in Fig. 4, that when the comb is completed it will be inconspicuous and will not require filling or plugging by means of cement, rubber, or the like.

I am aware that it has heretofore been customary to vulcanize hard-rubber articles consisting of two halves or parts and that an aperture was made in one of these for the admission of steam or a heating fluid for the purpose of equalizing the pressure. Such a device is shown in the patent to Smith, No. 220,947, dated October 28, 1879. In that patent the aperture is shown as of considerable size, as it was intended to serve both to equalize the pressure and to afterward permit the introduction of a liquid or viscous cement into the interior of the article. Such a relatively large aperture was required to be filled with cement or rubber after the article was completed. The present invention provides for the making of so small an aperture as to be inconspicuous by the insertion between the halves of the blank before the final pressing operation of a pin of small diameter, which is afterward withdrawn, leaving a very small aperture, as above described.

I have spoken of the sheet 10 and casing 18 as being made of rubber, by which it will of course be understood that any well-known rubber compound suitable for vulcanization is intended.

What I claim is—

1. A method of making hollow rubber articles comprising: forming at least two separate concave-faced portions of the article between layers of tin-foil; stripping off the foil from the concave faces of each of the separate portions; placing these portions in contact and uniting them, having first placed between them a pin of small diameter which extends from the cavity of the article to the periphery of the foil covering; withdrawing the pin; and subjecting the article to the action of a heating fluid for vulcanizing the same.

2. A method of making hollow rubber articles comprising: forming at least two separate concave-faced portions of the article between layers of tin-foil; stripping off the foil from the concave faces of each of the separate portions; incasing a pin of small diameter with a layer of unvulcanized rubber; placing the portions of the article in contact and uniting them, having first placed between them such incased pin; withdrawing the pin, leaving its casing extending from the cavity in the article to the periphery of the foil covering; and subjecting the article to the action of a heating fluid for vulcanizing the same.

3. A method of making hollow rubber articles comprising: placing each of two layers of unvulcanized rubber between two sheets of tin-foil; shaping each of said sheets so covered with foil in a die to form one concave-faced side of the article to be made; stripping off the foil from the concave faces of each of said sides; placing said faces together and uniting them by means of a suitable press, having first placed between them a pin of small diameter which extends from the cavity of the article to the periphery of the foil covering; withdrawing the pin; and subjecting the article to the action of a heating fluid for vulcanizing the same.

In testimony whereof I have signed this specification in the presence of two subscribing witnesses.

WILLIAM W. WEITLING.

Witnesses:
   JAS. A. GILES,
   JNO. A. DICKSON.